US008739387B1

(12) United States Patent
Frishberg

(10) Patent No.: US 8,739,387 B1
(45) Date of Patent: Jun. 3, 2014

(54) REUSABLE CABLE TIE

(71) Applicant: Dov Frishberg, Brooklyn, NY (US)

(72) Inventor: Dov Frishberg, Brooklyn, NY (US)

( * ) Notice: Subject to any disclaimer, the term of this patent is extended or adjusted under 35 U.S.C. 154(b) by 0 days.

(21) Appl. No.: 14/072,074

(22) Filed: Nov. 5, 2013

(51) Int. Cl.
*F16L 3/233* (2006.01)
*B65D 63/10* (2006.01)
*A44B 18/00* (2006.01)

(52) U.S. Cl.
USPC ............ 29/525.01; 24/16 R; 24/18; 140/93.2; 140/93 A; 174/135; 206/343

(58) Field of Classification Search
USPC ....... 29/525.01; 24/16 R, 18; 140/93.2, 93 A; 174/135; 206/343
See application file for complete search history.

(56) References Cited

U.S. PATENT DOCUMENTS

| | | | |
|---|---|---|---|
| 4,910,831 A | | 3/1990 | Bingold |
| 5,042,535 A | * | 8/1991 | Schlottke .................... 140/93 A |
| 5,398,383 A | | 3/1995 | Bingold |
| 5,802,675 A | * | 9/1998 | Parsons .......................... 24/16 R |
| 5,901,416 A | * | 5/1999 | Mears .......................... 24/16 PB |
| 6,355,887 B1 | * | 3/2002 | Gretz ........................... 174/72 A |
| 7,131,168 B2 | | 11/2006 | Pangallo |
| 8,474,104 B2 | | 7/2013 | Watson |
| 2007/0234524 A1 | | 10/2007 | Witt |

* cited by examiner

*Primary Examiner* — David Bryant
*Assistant Examiner* — Jun Yoo
(74) *Attorney, Agent, or Firm* — Greenberg Traurig, LLC

(57) ABSTRACT

The invention relates to a tie and a method for tying at least one object. More particularly, the tie has a strip, which includes a tip, a connecting end opposite the tip and a plurality of teeth arranged on the strip between the tip and the connecting end, and a plurality of locking members, which are connected to the connecting end of the strip. Each of the locking members includes an opening for passage of the strip therethrough and a locking tab for engaging at least one of the teeth so as to allow the strip to move through the opening of a corresponding one of the locking members only in one direction. The method includes the steps of placing the tie around at least one object; passing the strip through the opening of a first one of the locking members in the one direction such that the tie wraps around the at least one object; and disconnecting the first one of the locking members from the connecting end of the strip while leaving at least another one of the locking members connected to the connecting end such that the tie can be reused for tying another object.

20 Claims, 3 Drawing Sheets

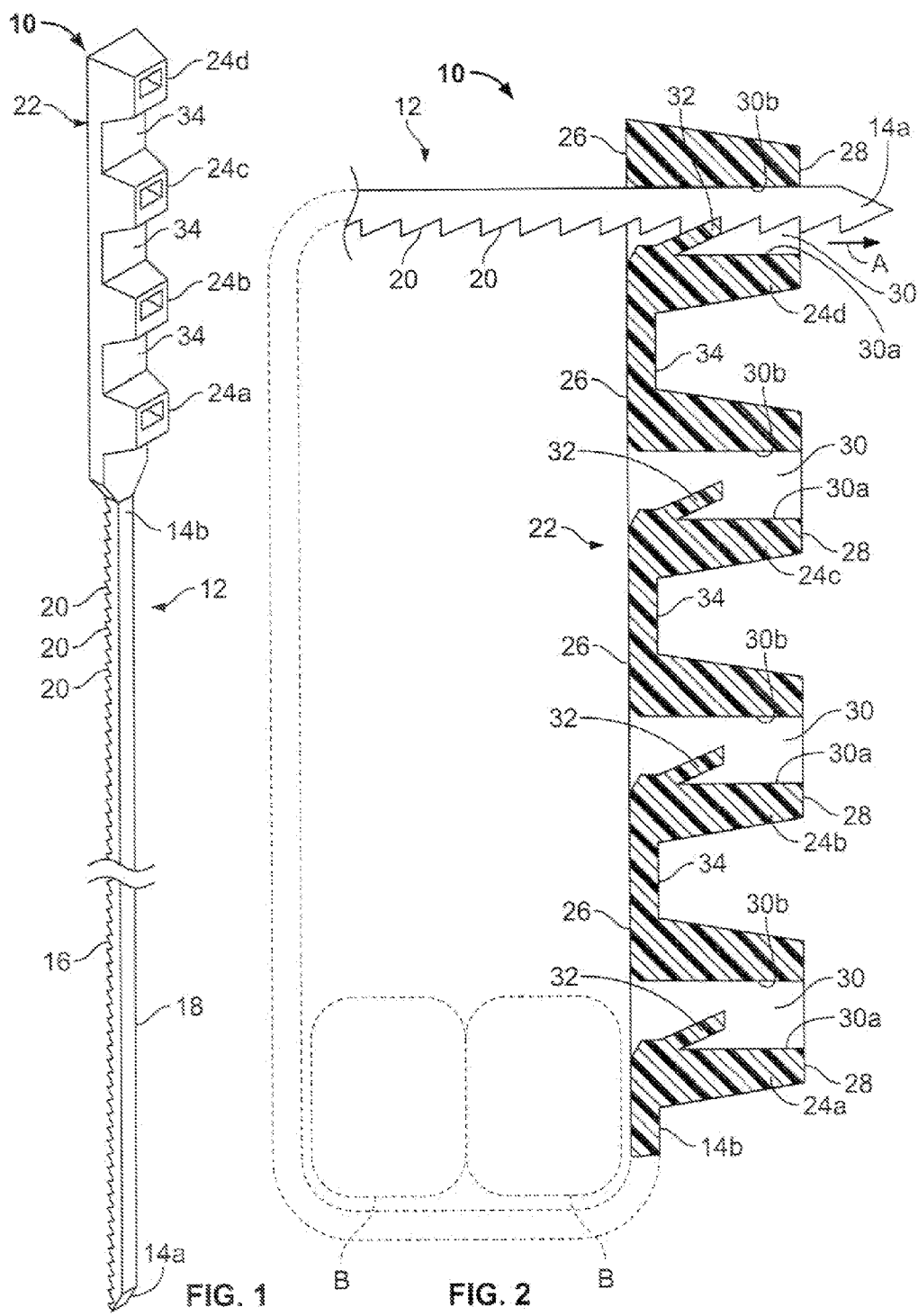

REUSABLE CABLE TIE

FIELD OF THE INVENTION

The present invention relates to a tie device for use in tying at least one object and, more particularly, a reusable tying device.

BACKGROUND OF THE INVENTION

Cable ties have been known in the past (see, e.g., U.S. Pat. Nos. 7,131,168 and 8,474,104 and U.S. Patent Application Publication No. 2007/0234524). Many of these ties are used once and then thrown away. Accordingly, it is desirable to provide a reusable cable tie.

SUMMARY OF THE INVENTION

In accordance with one embodiment, the present invention provides a method of using a tie for tying at least one object. More particularly, the tie is equipped with a strip, which includes a tip, a connecting end opposite the tip, and a plurality of teeth arranged on the strip between the tip and the connecting end. A locking head is connected to the connecting end of the strip and includes a plurality of locking members for engaging the strip. A first one of the locking members is located adjacent the connecting end of the strip, while a second one of the locking members is located remotely from the connecting end of the strip. Each of the locking members includes an opening for passage of the strip therethrough and a locking tab for allowing the strip to move through the opening of a corresponding one of the locking members only in one direction. The locking head also includes at least one connector connecting each of the locking members to an adjacent one of the locking members. The method includes the steps of placing the tie around the at least one object; and passing the strip through the opening of the second one of the locking members in the one direction so as to tie the at least one object. The method also includes the steps of cutting or separating the connector connecting the second one of the locking members to an adjacent one of the locking members, thereby disconnecting the second one of the locking members from the locking head; and moving the second one of the locking members along the strip toward the connecting end of the strip for subsequent use of the tie.

Another embodiment of the present invention involves providing a strip having a tip, a connecting end opposite the tip and a plurality of teeth arranged on the strip between the tip and the connecting end. The tie also includes a locking head connected to the connecting end of the strip. The locking head has a free end opposite the strip and includes a plurality of locking members arranged linearly or in parallel along the locking head. Each of the locking members is provided with a single opening for passage of the strip therethrough and includes an entry side, through which the tip of the strip is inserted into a corresponding one of the openings, and an exit side, through which the tip of the strip exits from a corresponding one of the openings. Each of the locking members is constructed such that the strip can pass through a selected one of the openings only in one direction. The locking members are arranged such that all of the entry sides of the locking members are located on the same side of the locking head.

BRIEF DESCRIPTION OF THE DRAWINGS

For a more complete understanding of the present invention, reference is made to the following detailed description of an exemplary embodiment considered in conjunction with the accompanying drawings, in which:

FIG. 1 is a perspective view of a cable tie constructed in accordance with an embodiment of the present invention;

FIG. 2 is an in-use schematic, partial cross-sectional view of the cable tie of FIG. 1;

DETAILED DESCRIPTION OF THE INVENTION

Figure 3:
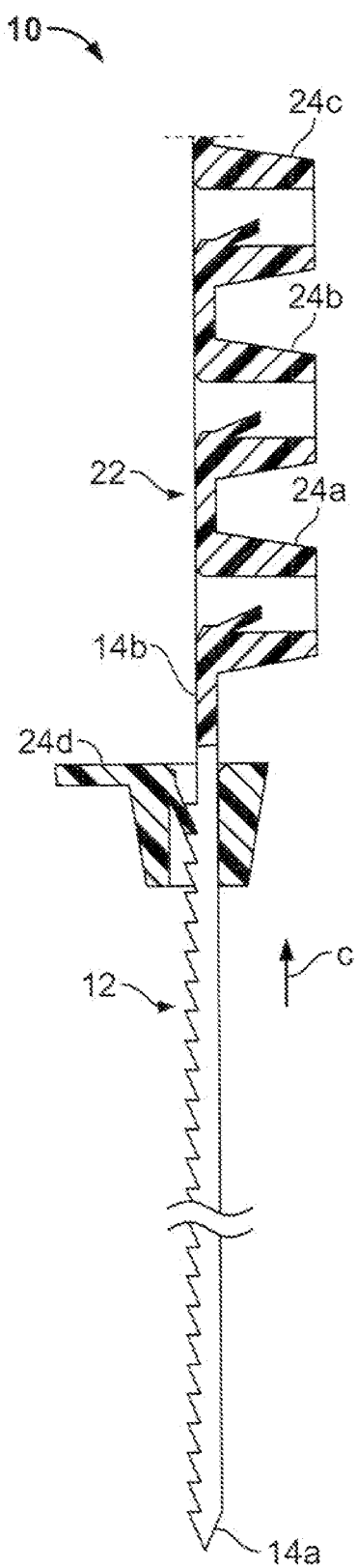
FIG. 3 is a partial cross-sectional view of the cable tie of FIG. 1 after its initial use.

FIG. 1 illustrates a cable tie 10 constructed in accordance with an embodiment of the present invention. More particularly, the tie 10 includes a strip 12 having an insertion tip 14a at one end thereof, a connecting end 14b opposite the tip 14a, and a pair of sides 16, 18. Teeth 20 are provided on the side 16 of the strip 12 along substantially the entire length thereof.

Now referring to FIGS. 1 and 2, the tie 10 also includes a locking head 22 attached to the connecting end 14b of the strip 12 opposite the insertion tip 14a. The locking head 22 includes a plurality of locking members 24a-24d, which are identical to each other in construction and operation. The locking members 24a-24d are constructed in a manner similar to that of locking members in conventional cable ties. Examples of conventional cable ties are illustrated in U.S. Pat. Nos. 7,131,168 and 8,474,104 and U.S. Patent Application Publication No. 2007/0234524, the disclosures of which are incorporated herein by reference in their entireties.

The locking members 24a-24d are arranged linearly or in parallel along the locking head 22 such that the locking member 24d is positioned farthest away from the tip 14a of the strip 12, while the locking member 24a is located closest to same. As a result, the locking member 24d is positioned at an end of the tie 10 opposite the tip 14a, while the locking member 24a is connected to the connecting end 14b of the strip 12. The locking members 24b, 24c are positioned between the locking members 24a, 24d. Each of the locking members 24a-24d is connected, either directly or indirectly, to the connecting end 14b of the strip 12.

Each of the locking members 24a-24d is provided with an insertion side 26, an opposite exit side 28 (see FIG. 2). In addition, each of the locking member 24a-24d includes a single channel or opening 30 extending between a corresponding pair of the insertion sides 26 and the exit sides 28 of the locking members 24a-24d. Each of the channels 30 of the locking members 24a-24d is sized and shaped such that the insertion tip 14a of the strip 12 can be inserted into the channel 30 from its associated entry side 26 and exit therefrom from its associated exit side 28. In one embodiment, all of the entry sides 26 of the locking members 24a-24d are positioned on the same side of the locking head 22.

A locking tab 32 projects into each of the channels 30 of the locking members 24a-24d for engaging one or more of the teeth 20 of the strip 12. The locking tab 32 of each of the locking members 24a-24d is flexible so as to allow the strip 12 to move only in one direction (as indicated by Arrow A in FIG. 2) such that the strip 12 can be locked in place with a selected one of the locking members 24a-24d. In one embodiment, each of the locking tabs 32 is provided only on one side of a corresponding one of the channels 30 of the locking members 24a-24d (i.e., either sides 30a of the channels 30 proximate the connecting end 14b of the strip 12 or sides 30b of the channels 30 remote from the connecting end 14b of the strip 12). In another embodiment, the locking tabs 32 can be provided on both sides of the channels 30, in which case the teeth 20 are provided on both of the sides 16, 18 of the strip 12 for engaging the locking tabs 32.

Still referring to FIGS. 1 and 2, each of the locking members 24a-24d is connected to an adjacent one of the locking members 24a-24d by a connector 34. Each of the connectors 34 is provided with a sufficient strength to withstand the force needed when the cable tie 10 is used in tying cables (or an object or objects) tightly. Each of the connectors 34 is adapted so as to be cut with a cutting tool, such as scissors, a knife, etc., or otherwise disconnected.

As shown in FIG. 1, the entire tie 10 can be constructed as a single, integrally molded piece and made from any suitable conventional material, such as plastic. The tie 10, including the locking head 22, is flexible such that it can wrap around a group of cables (or an object or objects) for securing same. Alternatively, the various components of the tie 10 (e.g., the strip 12, the locking head 22, etc.) can be made separately and then attached to each other.

In order to tie cables together, the tie 10 is placed around cables B (only two of which are shown in FIG. 2 in broken-line representation) in a conventional manner. The tip 14a of the tie 10 is then inserted into the channel 30 of the locking member 24d (i.e., the locking member which is located the farthest from the tip 14a when the tie 10 is in its linear orientation as shown in FIG. 1). Thereafter, the strip 12 is pulled through the locking head 24d until the tie 10 wraps tightly around the cables B.

Figure 4:
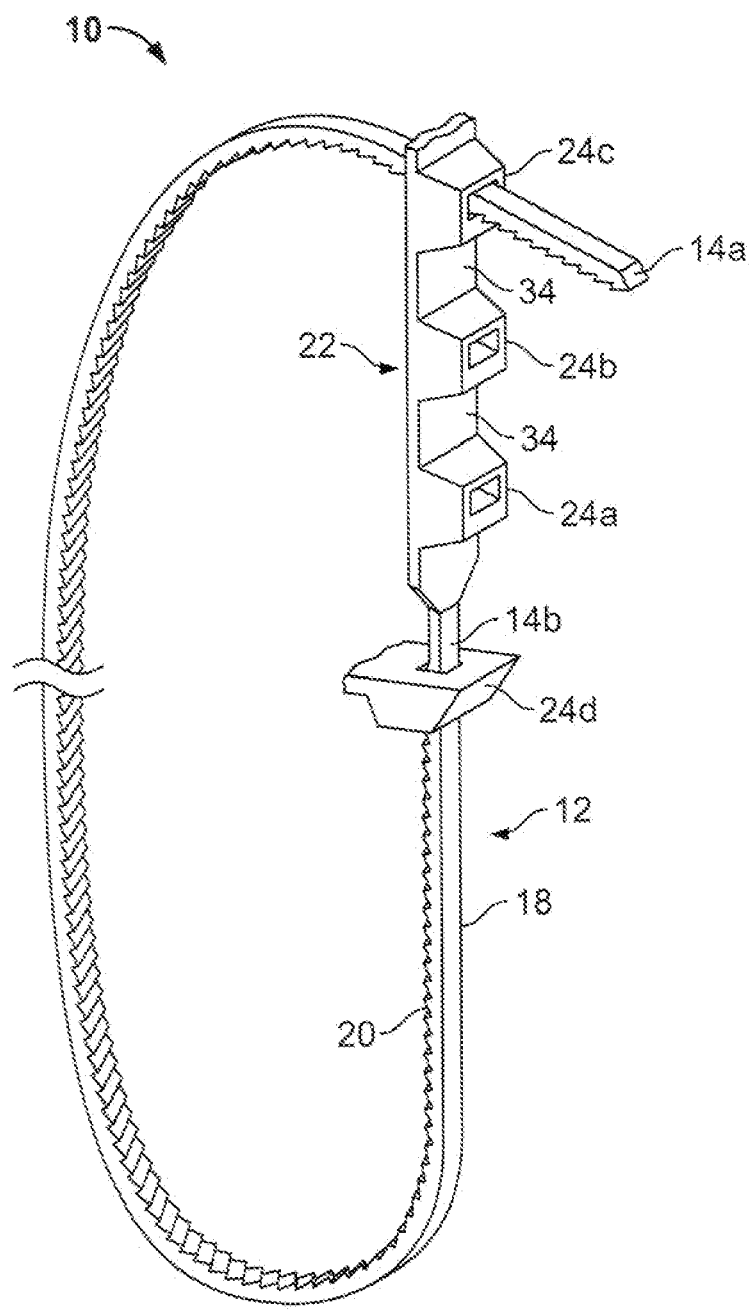
FIG. 4 is a perspective view of the cable tie of FIG. 1, illustrating its subsequent use.

To release the cables B from the tie 10, the connector 34 connecting the locking member 24d to its adjacent locking member (i.e., the locking member 24c) is cut such that only the locking member 24d is separated or disconnected from the rest of the locking head 22, causing the tie 10 to release. Once released, the locking member 24d is moved along the strip 12 toward the locking head 22 (as indicated by arrow C in FIG. 3) such that it is positioned at or adjacent the connecting end 14b of the strip 12 proximate the locking member 24a (i.e., the locking member which is located closest to the strip 12). Throughout such movement, the locking member 24d is engaged with the strip 12. Because the locking members 24a-24c remain on the locking head 22, the tie 10 can be reused to tie cables or other objects in basically the same manner discussed above (e.g., by inserting the strip 12 through the locking member which is the farthest from the tip 14a, namely the locking member 24c as illustrated in FIG. 4).

It should be noted that the present invention may have many modifications and variations. For instance, the tie 10 can be provided with any number of locking members (e.g. two or more). Moreover, the tie 10 can be used to hold together objects other than cables. In one embodiment, each of the locking members 24a-24d can be formed as a member that is separate and distinct from one another and connected directly to the connecting end 14b of the strip 12 by a separate and independent connector. As a result, the locking members 24a-24d in this embodiment are not connected to one another and do not therefore form a single, integral, linear locking head.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

I claim:

1. A method of using a tie, the tie having a strip, which includes a tip, a connecting end opposite the tip and a plurality of teeth arranged on the strip between the tip and the connecting end, and a plurality of locking members, which are connected to the connecting end of the strip, each of the locking members including an opening for passage of the strip therethrough and a locking tab for engaging at least one of the teeth so as to allow the strip to move through the opening of a corresponding one of the locking members only in one direction, said method comprising the steps of:

placing the tie around at least one object;

passing the strip through the opening of a first one of the locking members in the one direction such that the tie wraps around the at least one object; and disconnecting the first one of the locking members from the connecting end of the strip while leaving at least another one of the locking members connected to the connecting end of the strip such that the tie can be reused for tying another object, the first one of the locking members being connected indirectly to the connecting end of the strip via the at least another one of the locking members prior to the performance of said disconnecting step.

2. The method of claim 1, further comprising the step of moving the first one of the locking members along the strip toward the connecting end of the strip for subsequent use of the tie.

3. The method of claim 2, wherein the locking members are formed as a single locking head connected to the connecting end of the strip, the at least another one of the locking members includes a second one of the locking members, the first one of the locking members being positioned remotely from the connecting end of the strip, the second one of the locking members being positioned adjacent the connecting end of the strip, the locking head including at least one connector connecting each of the locking members to an adjacent one of the locking members.

4. The method of claim 3, wherein the at least another one of the locking members includes a third one of the locking members, the second one of the locking members being connected directly to the connecting end of the strip, the third one of the locking members being positioned between the first one and second one of the locking members.

5. The method of claim 4, wherein the at least another one of the locking members includes a fourth one of the locking members, the fourth one of the locking members being positioned between the first one and third one of the locking members.

6. The method of claim 3, wherein the tie has an end opposite the tip of the strip, the first one of the locking members being located at the end of the tie.

7. The method of claim 3, wherein said disconnecting step includes the step of separating at or cutting the connector connecting the first one of the locking members to an adjacent one of the locking members, thereby disconnecting the first one of the locking members from the locking head.

8. The method of claim 2, wherein the first one of the locking members is engaged with the strip throughout the performance of said moving step; and wherein said moving step includes the step of positioning the first one of the locking members at the connecting end of the strip.

9. The method of claim 1, further comprising the steps of placing the tie around at least one other object; and passing the strip through the opening of the at least another one of the locking members in the one direction such that the tie wraps around the at least one other object.

10. The method of claim 1, wherein said passing step includes the steps of inserting the tip of the strip through the opening of the first one of the locking members and tightening the tie around the at least one object.

11. The method of claim 1, wherein the at least one object includes a plurality of cables.

12. The method of claim 1, wherein the first one of the locking members is connected to the at least another one of the locking members prior to the performance of said disconnecting step.

13. The method of claim 12, wherein the at least another one of the locking members includes at least two of the locking members.

14. A method of using a tie, the tie having a strip, which includes a tip, a connecting end opposite the tip and a plurality of teeth arranged on the strip between the tip and the connecting end, and a plurality of locking members, which are connected to the connecting end of the strip, each of the locking members including an opening for passage of the strip therethrough and a locking tab for engaging at least one of the teeth so as to allow the strip to move through the opening of a corresponding one of the locking members only in one direction, said method comprising the steps of:

placing the tie around at least one object;

passing the strip through the opening of a first one of the locking members in the one direction such that the tie wraps around the at least one object;

disconnecting the first one of the locking members from the connecting end of the strip while leaving at least another one of the locking members connected to the connecting end of the strip such that the tie can be reused for tying another object; and moving the first one of the locking members along the strip toward the connecting end of the strip for subsequent use of the tie, wherein the locking members are formed as a single locking head connected to the connecting end of the strip, the at least another one of the locking members includes a second one of the locking members, the first one of the locking members being positioned remotely from the connecting end of the strip, the second one of the locking members being positioned adjacent the connecting end of the strip, the locking head including at least one connector connecting each of the locking members to an adjacent one of the locking members, wherein the at least another one of the locking members includes a third one of the locking members, the second one of the locking members being connected directly to the connecting end of the strip, the third one of the locking members being positioned between the first one and second one of the locking members.

15. The method of claim 14, wherein the at least another one of the locking members includes a fourth one of the locking members, the fourth one of the locking members being positioned between the first one and third one of the locking members.

16. The method of claim 14, wherein the tie has an end opposite the tip of the strip, the first one of the locking members being located at the end of the tie.

17. The method of claim 14, wherein said disconnecting step includes the step of separating at or cutting the connector connecting the first one of the locking members to an adjacent one of the locking members, thereby disconnecting the first one of the locking members from the locking head.

18. The method of claim 14, wherein the first one of the locking members is engaged with the strip throughout the performance of said moving step; and wherein said moving step includes the step of positioning the first one of the locking members at the connecting end of the strip.

19. The method of claim 14, further comprising the steps of placing the tie around at least one other object; and passing the strip through the opening of the at least another one of the locking members in the one direction such that the tie wraps around the at least one other object.

20. The method of claim 14, wherein said passing step includes the steps of inserting the tip of the strip through the opening of the first one of the locking members and tightening the tie around the at least one object.

* * * * *